(12) United States Patent
Alexander et al.

(10) Patent No.: US 10,982,358 B2
(45) Date of Patent: Apr. 20, 2021

(54) MULTI-FUNCTIONAL KNITTED TEXTILES

(71) Applicant: GM Global Technology Operations LLC, Detroit, MI (US)

(72) Inventors: Paul W. Alexander, Ypsilanti, MI (US); Nancy L. Johnson, Northville, MI (US); Anthony L. Smith, Troy, MI (US); Christopher P. Henry, Thousand Oaks, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 419 days.

(21) Appl. No.: 15/854,219

(22) Filed: Dec. 26, 2017

(65) Prior Publication Data
US 2019/0194843 A1    Jun. 27, 2019

(51) Int. Cl.
| | | |
|---|---|---|
| *D04B 1/16* | (2006.01) | |
| *D01D 5/24* | (2006.01) | |
| *D04B 1/18* | (2006.01) | |
| *D02G 3/44* | (2006.01) | |
| *B32B 5/02* | (2006.01) | |
| *B32B 5/26* | (2006.01) | |

(52) U.S. Cl.
CPC ............... *D04B 1/16* (2013.01); *B32B 5/026* (2013.01); *B32B 5/26* (2013.01); *D01D 5/24* (2013.01); *D02G 3/44* (2013.01); *D04B 1/18* (2013.01); *B32B 2250/20* (2013.01); *B32B 2307/412* (2013.01); *B32B 2307/414* (2013.01); *D10B 2401/02* (2013.01); *Y10T 442/431* (2015.04)

(58) Field of Classification Search
CPC . D04B 1/16; D04B 1/18; D04B 21/08; D01D 5/24; D10B 2401/02–2401/046
See application file for complete search history.

(56) References Cited

U.S. PATENT DOCUMENTS

| | | |
|---|---|---|
| 5,021,281 A | 6/1991 | Bompard et al. |
| 5,858,159 A | 1/1999 | Holbrook et al. |
| 6,350,709 B1 | 2/2002 | Veiga |
| 6,808,587 B2 | 10/2004 | Bohm et al. |
| 7,437,774 B2 * | 10/2008 | Baron ............... D03D 9/00 2/69 |

(Continued)

FOREIGN PATENT DOCUMENTS

CN          101640953 A         2/2010

OTHER PUBLICATIONS

Textile Glossary, Celanese Acetate, copyright 2001 (Year: 2001).

*Primary Examiner* — Jenna L Johnson
(74) *Attorney, Agent, or Firm* — Quinn IP Law

(57) ABSTRACT

The knitted textiles include a knitted structure including a plurality of hollow yarns. Each hollow yarn includes a yarn body and defines a yarn hole extending through the yarn body to allow expansion of the yarn body upon inflation of each hollow yarn through the yarn hole. The knitted structure is configured to transition from an unexpanded state to an expanded state in response to the inflation of the hollow yarns through the yarn hole. The knitted structure has a first porosity in the unexpanded state, and the knitted structure has a second porosity in the expanded state. The second porosity is less than the first porosity such that a visibility through the knitted structure is greater when the knitted structure is in the unexpanded state than when the knitted structure is in the expanded state.

8 Claims, 6 Drawing Sheets

(56) References Cited

U.S. PATENT DOCUMENTS

| | | | |
|---|---|---|---|
| 7,976,924 B2 * | 7/2011 | Stanford, Jr. | A62B 17/005 428/92 |
| 8,362,882 B2 | 1/2013 | Heubel et al. | |
| 8,371,339 B2 | 2/2013 | Li et al. | |
| 9,090,998 B2 * | 7/2015 | Williams | D01F 8/14 |
| 9,521,885 B2 | 12/2016 | Weber et al. | |
| 2003/0101776 A1 | 6/2003 | Shirasaki et al. | |
| 2009/0044338 A1 | 2/2009 | Rock et al. | |
| 2010/0129575 A1 | 5/2010 | Veiga | |
| 2011/0062134 A1 | 3/2011 | Lochtman et al. | |
| 2011/0283459 A1 | 11/2011 | Essers | |
| 2012/0280479 A1 | 11/2012 | Barth et al. | |
| 2014/0001814 A1 | 1/2014 | Fujita et al. | |
| 2016/0303799 A1 | 10/2016 | Pettey et al. | |
| 2017/0249033 A1 | 8/2017 | Podhajny et al. | |

* cited by examiner

MULTI-FUNCTIONAL KNITTED TEXTILES

INTRODUCTION

The present disclosure generally relates to multi-functional knitted textiles. For instance, the present disclosure describes variable porosity knitted textiles including inflatable tubular yarns.

Knitted textiles are used for many purposes. For instance, knitted textiles can be used as a covering for a vehicle seat. Also, knitted textiles can be used for vehicle trims.

SUMMARY

The present disclosure relates to multi-functional knitted textiles. In some embodiments, the knitted textiles include a knitted structure including a plurality of hollow yarns. Each of the plurality of hollow yarns includes a yarn body. Each of the plurality of hollow yarns defines a yarn hole extending through the yarn body to allow expansion of the yarn body upon inflation of each of the plurality of hollow yarns through the yarn hole. The yarn body can also collapse/contract upon drawing a vacuum or negative pressure. The knitted structure is configured to transition from an unexpanded state to an expanded state in response to the inflation of the hollow yarns through the yarn hole. The knitted structure has a first porosity in the unexpanded state, and the knitted structure has a second porosity in the expanded state. The second porosity is less than the first porosity such that a visibility through the knitted structure is greater when the knitted structure is in the unexpanded state than when the knitted structure is in the expanded state. The hollow yarns may be tubular yarns. The breathability through the knitted structure is greater when the knitted structure is in the unexpanded state than when the knitted structure is in the expanded state. Each of the plurality of hollow yarns may include an elastomer. The knitted structure defines a plurality of pores between the plurality of hollow yarns. The plurality of pores have a first average pore size when the knitted structure is in the unexpanded state. The plurality of pores have a second average pore size when the knitted structure is in the expanded state. The second average pore size is less than the first average pore size such that a thermal conductivity of the knitted structure is less when the knitted structure is in the expanded state than when the knitted structure is in the unexpanded state. Each of the plurality of hollow yarns may include a plurality of dopant particles. Each of the plurality of dopant particles may be thermally conductive particles. The dopant particles are closer to each other when the knitted structure is in the unexpanded state than when the knitted structure is in the expanded state such that an electrical conductivity of the knitted structure is greater when the knitted structure is in the unexpanded state than when the knitted structure is in the expanded state.

In some embodiments, the knitted textile includes a knitted structure including a plurality of hollow yarns. Each of the plurality of hollow yarns includes a yarn body. Each of the plurality of hollow yarns defines a yarn hole extending through the yarn body to allow fluid flow through the yarn body in order to control a temperature of the knitted structure. Each of the hollow yarns defines an inner yarn surface and an outer yarn surface. The outer yarn surface is opposite the inner yarn surface. The inner yarn surface defines the yarn hole. Each of the plurality of hollow yarn may include a plurality of thermally-conductive particles embedded in each of the hollow yarns which matrix is less thermally conductive. The thermally-conductive particles are embedded between the inner yarn surface and the outer yarn surface in order to minimize the thermal conductivity of each of the hollow yarns when expanded/inflated and maximize thermal conductivity when relaxed/deflated/vacuumed. Each of the hollow yarns includes a circumferential wall. The circumferential wall defines an inner yarn surface and an outer yarn surface. The outer yarn surface is opposite the inner yarn surface. The inner yarn surface defines the yarn hole. The yarn hole is a longitudinal hole. The hollow yarns may be porous tubular yarns that defines a plurality of thru-holes extending from the inner yarn surface to the outer yarn surface to allow a fluid flowing through the longitudinal hole to exit the yarn body through the thru-holes, thereby allowing the fluid to exit the yarn body through the circumferential wall. The knitted textile may include a plurality of transparent yarns to control observable angles through the knitted structure. The knitted structure may include a plurality of translucent yarns to control observable angles through the knitted structure. The knitted structure may include optically-active yarns to control observable angles through the knitted structure.

In some embodiments, the knitted textile includes a first knitted fabric layer, a second knitted fabric layer, and a knitted spacer fabric interconnecting the first knitted fabric layer and the second knitted fabric layer. The knitted spacer fabric includes a plurality of moisture-wicking yarns. The plurality of moisture-wicking yarns interconnect the first knitted fabric layer and the second knitted fabric layer to transport moisture from the first knitted fabric layer toward the second knitted fabric layer. The second knitted fabric layer includes a plurality of absorbent yarns to collect the moisture transported from the first knitted fabric layer to the second knitted fabric layer through the plurality of moisture-wicking yarns. The second knitted fabric layer may include a plurality of anti-microbial yarns to kill bacteria. The second knitted fabric layer may include a plurality of yarn loops in order to maximize a speed of moisture evaporation. Each of the plurality of absorbent yarns includes a yarn body and a yarn hole extending through the yarn body to allow air to flow through the yarn body. Each of the plurality of absorbent yarn includes a hygroscopic material to absorb moisture in response to the air flowing through the yarn hole of each of the plurality of absorbent yarns. Each of the plurality of absorbent yarns includes a yarn body and a yarn hole extending through the yarn body. The yarn body includes a hygroscopic material configured to absorb moisture. Each of the plurality of absorbent yarns includes a core extending through the yarn hole. The core includes a hydrophilic material to aid in a capillary action for moisture transport. Instead of the core, a hydrophilic coating is applied on the interior of the yarn body.

The above features and advantages and other features and advantages of the present teachings are readily apparent from the following detailed description of the best modes for carrying out the teachings when taken in connection with the accompanying drawings.

DETAILED DESCRIPTION

Figure 1:
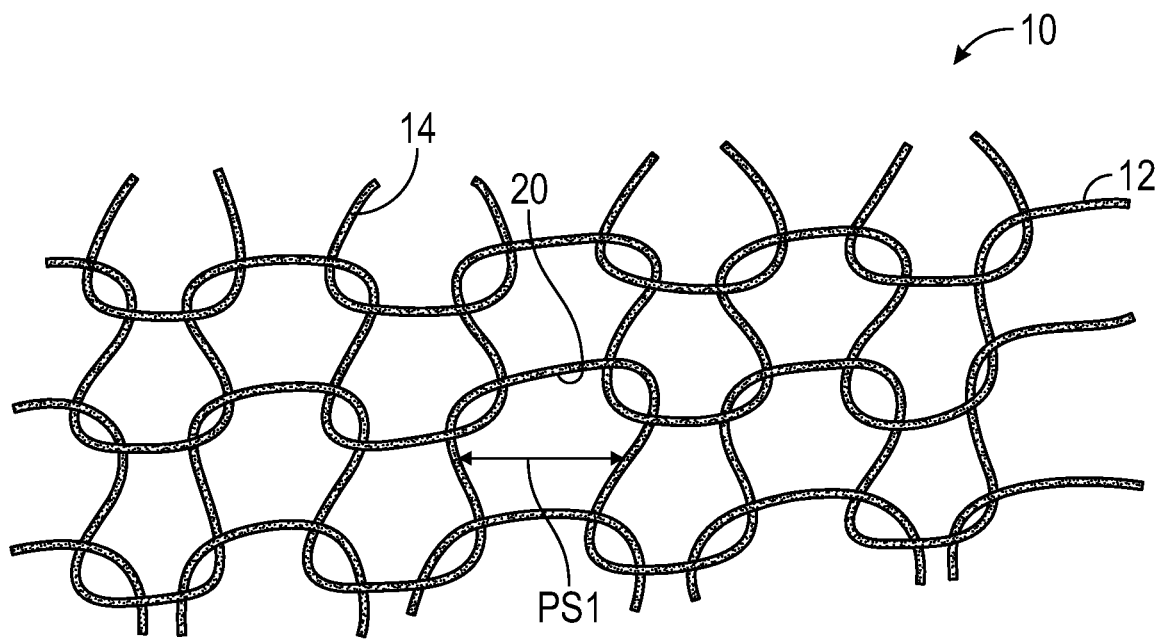
FIG. 1 is a schematic front view of a knitted textile including hollow yarns, wherein the hollow yarns are in an unexpanded state.
Figure 2:
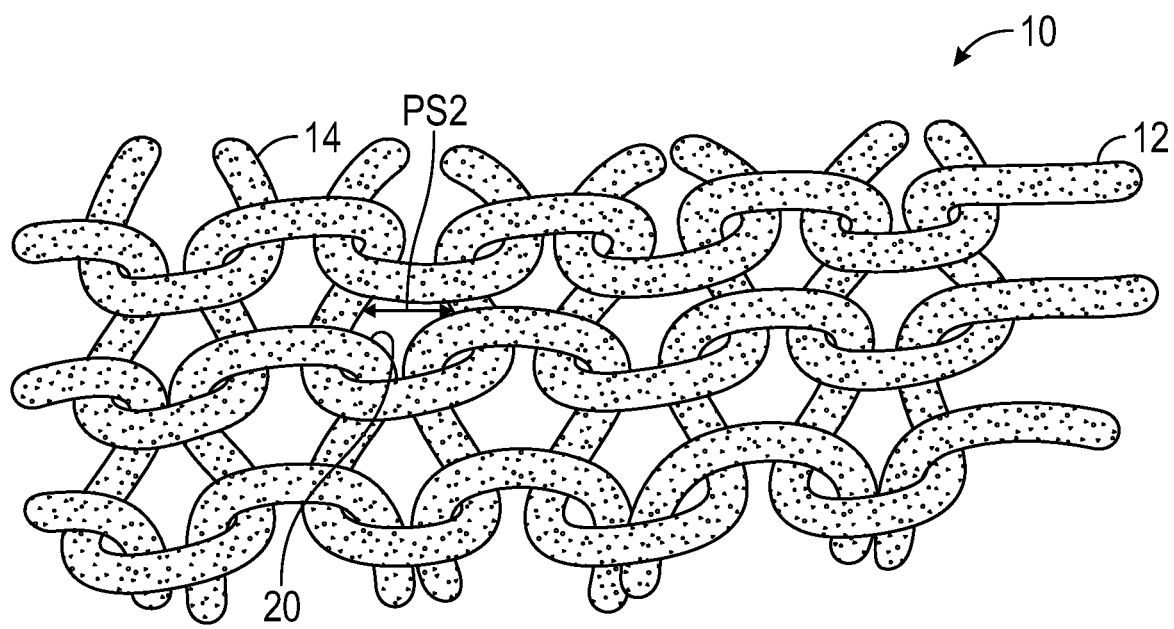
FIG. 2 is a schematic front view of a knitted textile of FIG. 1, wherein the hollow yarns are in the expanded state.

Referring to the drawings, wherein like reference numbers correspond to like or similar components throughout the several figures, and beginning with FIGS. 1-4, a knitted textile 10 includes a knitted structure 12 including a plurality of hollow yarns 14. The hollow yarns 14 may be, for example, tubular yarns that can be inflated to change the porosity and/or density of the knitted structure 12. Each of the hollow yarns 14 includes a yarn body 16 and defines the yarn hole 18 extending through the yarn body 16 to allow expansion of the yarn body 16 upon inflation of the hollow yarn 14 through the yarn hole 18. Accordingly, the knitted structure 12 is configured to transition from an unexpanded state (e.g., deflated state as shown in FIG. 1) to an expanded state (e.g., inflated state as shown in FIG. 2) in response to the inflation of the hollow yarns 14 through the yarn hole 18. When the hollow yarns 14 are in the unexpanded (e.g., deflated) state, the knitted structure 12 is relatively open and porous, wherein, when the hollow yarns 14 are in the expanded (e.g., inflated) state, the knitted structure 12 fills the gaps between the hollow yarns 14. In other words, when the knitted structure 12 transitions from the unexpanded state to the expanded state, the hollow yarns 14 thicken. The knitted structure 12 has a first porosity and/or density in the unexpanded state (FIG. 1) and a second porosity and/or density in the expanded state (FIG. 2). The second porosity (FIG. 2) of the knitted structure 12 is less than the first porosity (FIG. 1), and, as a consequence, the visibility through the knitted structure 12 is greater when the knitted structure 12 is in the unexpanded state (FIG. 1) than when the knitted structure 12 is in the expanded state (FIG. 2). Likewise, the second density (FIG. 2) of the knitted structure 12 is greater than the first density (FIG. 1) of the knitted structure 12 and, as a consequence, the visibility through the knitted structure 12 is greater when the knitted structure 12 is in the unexpanded state (FIG. 1) than when the knitted structure is in the expanded state (FIG. 2). As discussed above, the hollow yarns 14 may be tubular to facilitate manufacturing. The breathability through the knitted structure 12 is greater when the knitted structure 12 is in the unexpanded state (FIG. 1) than when the knitted structure 12 is in the expanded state (FIG. 2). Accordingly, the breathability of the knitted structure 12 can be controlled to enhance comfort. The hollow yarns 14 may be partly or wholly made of an elastomer to facilitate expanding and contracting the hollow yarns 14.

With continuing reference to FIGS. 1 and 2, the knitted structure 12 defines a plurality of pores 20 between the hollow yarns 14. When the knitted structure is in the unexpanded state, pores 20 have a first average pore size PS1, and when the knitted structure is in the expanded state, the pores 20 have a second average pore size PS2. The second average pore size PS2 is less than the first average pore size PS1. As such, the thermal conductivity of the knitted structure 12 is less when the knitted structure 12 is in the expanded state than when the knitted structure 12 is in the unexpanded state. Specifically, because the pores 20 contract in when the hollow yarns 14 are in the expanded state, the breathability and therefore thermal insulation capabilities of the knitted structure 12 decrease relative to the when the hollow yarns 14 are in the unexpanded state. As a result, the thermal conductivity of the knitted structure 12 is less when the knitted structure 12 is in the expanded state than when the knitted structure 12 is in the unexpanded state.

Figure 3:
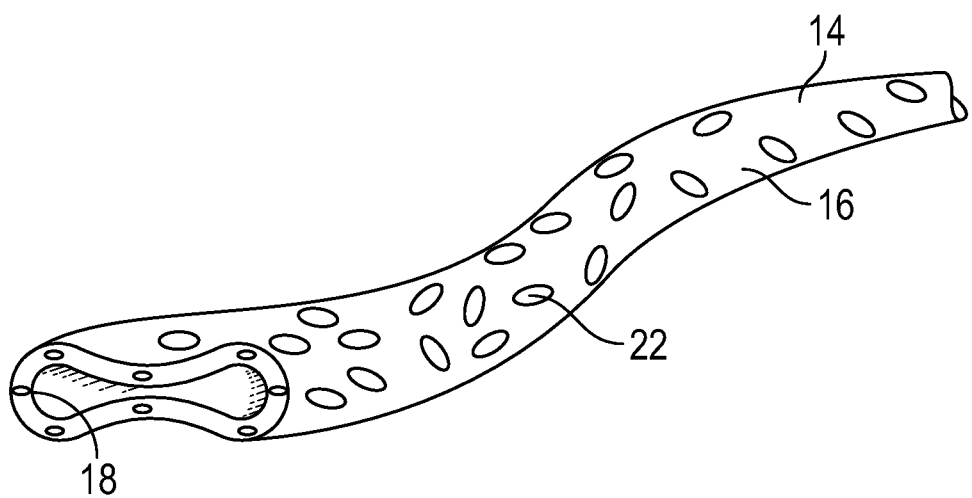
FIG. 3 is a schematic isometric view of the hollow yarn of the knitted textile of FIG. 1, depicting the hollow yarn in the unexpanded state.
Figure 4:
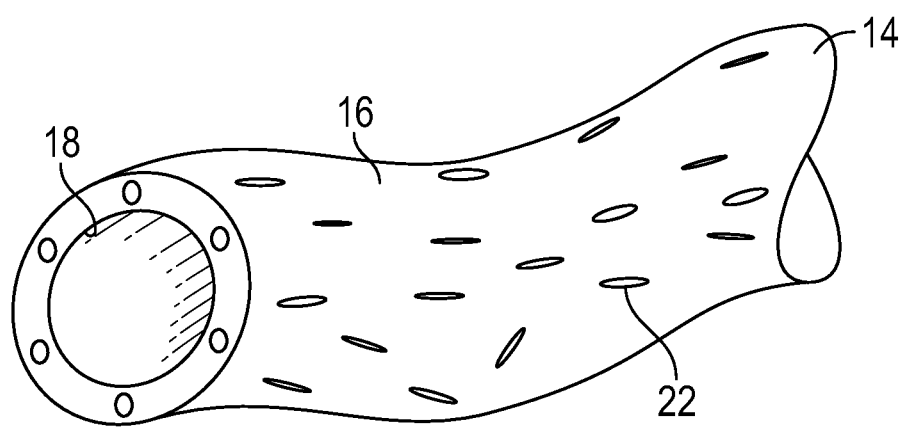
FIG. 4 is a schematic isometric view of the hollow yarn of the knitted textile of FIG. 1, depicting the hollow yarn in the expanded state.

With reference to FIGS. 3 and 4, each of the hollow yarns 14 includes dopant particles 22. In the depicted embodiment, the dopant particles 22 are entirely disposed inside the yarn body 16 for protection. Each of the dopant particles is a thermally conductive particle configured to conduct heat. As a non-limiting example, the dopant particles 22 may be wholly or partly made of a metallic material. When the hollow yarns 14 (and the knitted structure 12 shown in FIG. 1) are in the unexpanded (e.g., deflated) state, the dopant particles 22 are closer to each other than when the hollow yarns 14 (and the knitted structure 12 shown in FIG. 2) are in the expanded (e.g., inflated) state. Thus, the thermal conductivity of the hollow yarns 14 (and the knitted structure 12 shown in FIG. 1) is greater when the hollow yarns 14 (and the knitted structure 12 shown in FIG. 1) are in the unexpanded (e.g., deflated or when a vacuum is drawn inside the hollow yarns 14) state than when the knitted structure 12 is in the expanded (e.g., inflated) state as the distance between the thermally conductive particles is increased. In addition, in the expanded state, the air pockets trapped in the hollow yarns 14 enhance the thermal insulation capabilities of the knitted structure 12.

Figure 5:
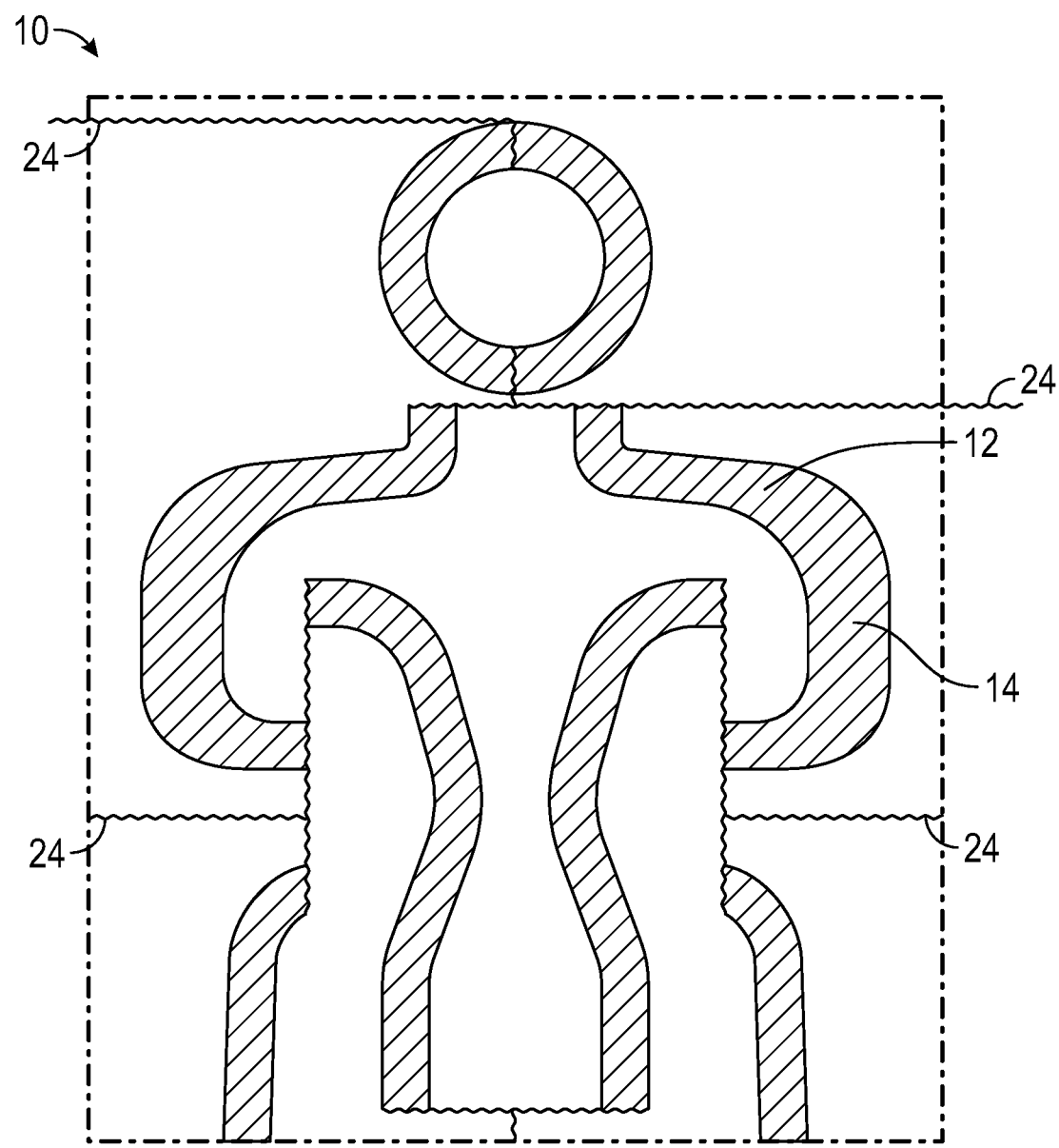
FIG. 5 is a schematic illustration of a knitted textile including fluid flow lines.
Figure 6:
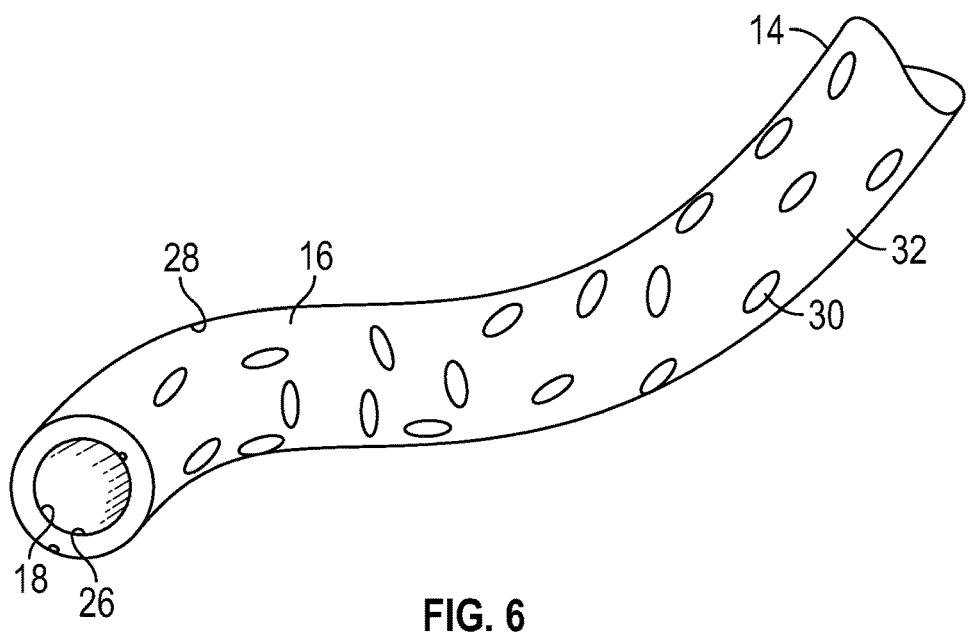
FIG. 6 is a schematic isometric view of a hollow yarn of the knitted textile shown in FIG. 5, depicting thermally-conductive particles.

With reference to FIGS. 5 and 6, in some embodiments, the knitted structure 12 can be configured for fluid transport, delivery and removal in order to control temperature along the knitted structure 12. Specifically, the hollow yarns 14 of the knitted structure 12 are configured to transport fluid through the yarn hole 18. As discussed above, the yarn body 16 defines the yarn hole 18. The yarn hole 18 extends through the yarn body 16 to fluid flow through the yarn body 16 in order to control the temperature of the knitted structure 12. As discussed above, the hollow yarns 14 may be tubular to facilitate manufacturing. The hollow yarns 14 may be knitted and/or inlayed in a predetermined pattern for targeted temperature control. The knitted textile 10 includes a plurality of fluid lines 24 configured to transport a fluid (e.g., gas) into and out of the hollow yarns 14. Accordingly, the fluid lines 24 are in fluid communication with the hollow yarns 14.

Each of the hollow yarns 14 includes a circumferential wall 32 that defines an inner yarn surface 26 and an outer yarn surface 28. The outer yarn surface 28 is opposite the inner yarn surface 26. The inner yarn surface 26 defines the yarn hole 18. Each of the hollow yarns 14 includes thermally-conductive particles 30 embedded in each of the hollow yarns 14 between the inner yarn surface 26 and the outer yarn surface 28 in order to maximize the thermal conductivity of each of the hollow yarns 14. In this embodiment, the thermal conductivity of the thermally conductive particles 30 is greater than the thermal conductivity of the matrix of the hollow yarns 14. As non-limiting examples, the thermally-conductive particles 30 may be wholly or partly made of silica aerogel and/or epoxy composite. Each thermally-insulating particle 30 is entirely disposed inside the yarn body 16 to enhance thermal insulation. Thus, each thermally-insulating particle 30 is entirely disposed between the inner yarn surface 26 and the outer yarn surface 28 for enhancing thermal transport. In the embodiment depicted in FIG. 6, except for the yarn hole 18, the yarn body 16 is entirely solid such that no fluid can exit through the circumferential wall 32 of the yarn body 16. Therefore, fluid can solely flow through the yarn hole 18 of the yarn body 16. Alternatively, negative pressure can be applied to the porous tubular yarn 14; this would draw air from the occupant, aiding in maintaining a comfortable thermal condition.

Figure 7:
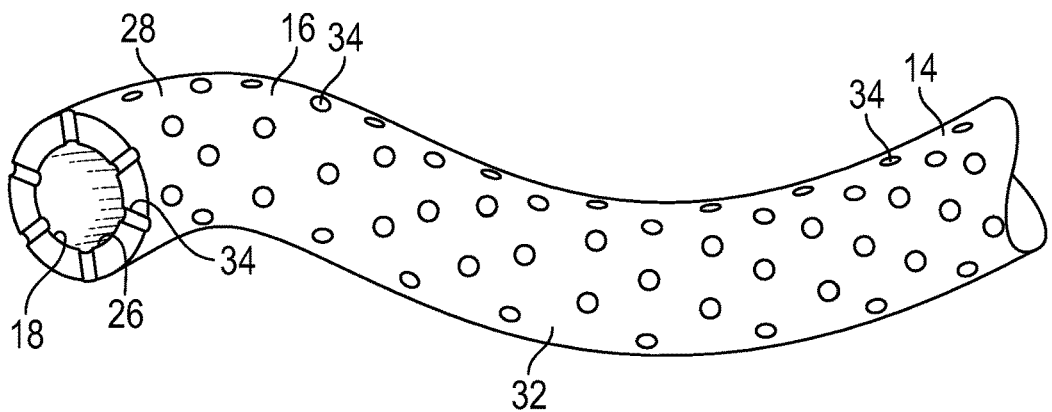
FIG. 7 is a schematic isometric view of a hollow yarn of the knitted textile shown in FIG. 5, depicting thru-holes extending through the circumferential wall of the hollow yarn.

In the embodiment depicted in FIG. 7, the yarn hole 18 is a longitudinal hole extending along the length of the hollow yarn 14, and each of the hollow yarns 14 is a porous tubular yarn that defines thru-holes 34 extending from the inner yarn surface 26 to the outer yarn surface 28 to allow a fluid flowing through the yarn hole 18 (i.e., the longitudinal hole) to exit the yarn body 16 through the thru-holes 34. As a consequence, the fluid flowing through the yarn hole 18 can exit the yarn body 16 through the circumferential wall 32, thereby allowing cooling (e.g., air cooling) of the knitted structure 12.

Figure 8:
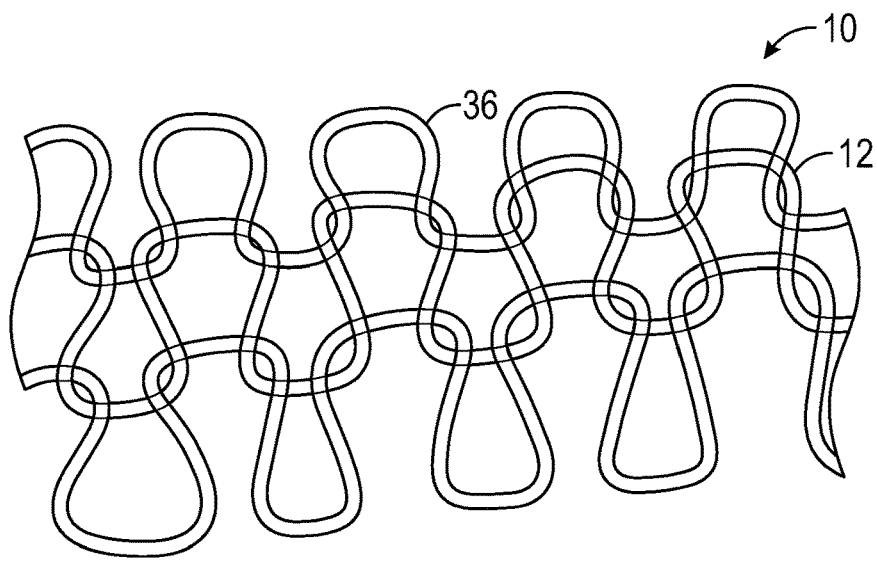
FIG. 8 is a schematic front view of a knitted textile.
Figure 9:
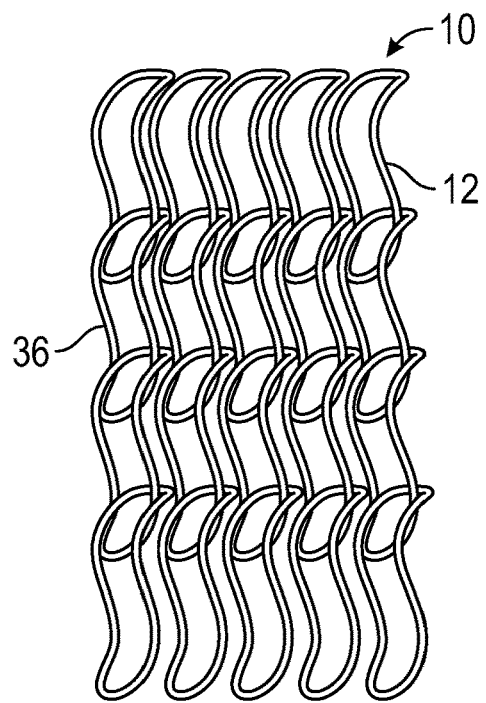
FIG. 9 is a schematic off-angle view of the knitted textile of FIG. 8.

With reference to FIGS. 8 and 9, the knitted textile 10 may include transparent, translucent and/or optically-active yarns 36 to control observable angles through the knitted structure 12. The transparent yarns 36 may be wholly or partly made of polyester. Translucent yarns 36 may be wholly or partly made of fiber glass. The optically-active yarns 36 may be wholly or partly made of photonic crystal materials, photoluminescent materials, luminescent materials, light transmitting materials, and reflective material. As shown in FIG. 8, the large gaps between the transparent, translucent and/or optically-active yarns 36 allow light to pass through the knitted structure 12 relatively unimpeded. However, as shown in FIG. 9, the visibility through the knitted structure 12 is reduced (relative to FIG. 8) when the knitted structure 12 is viewed at an off-angle. Accordingly, the knitted structure 12 could serve as a privacy screen, allowing visibility solely at certain angles.

Figure 10:
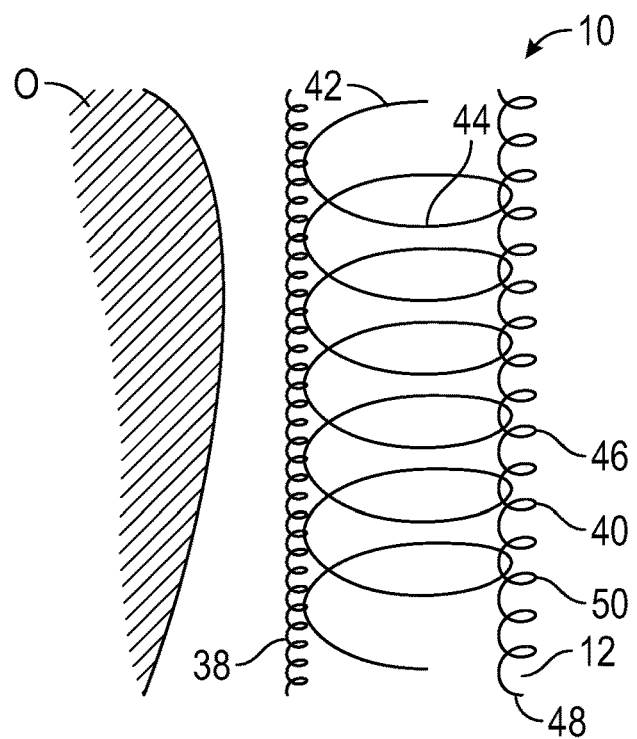
FIG. 10 is a schematic illustration of a knitted textile including absorbent yarns.
Figure 11:
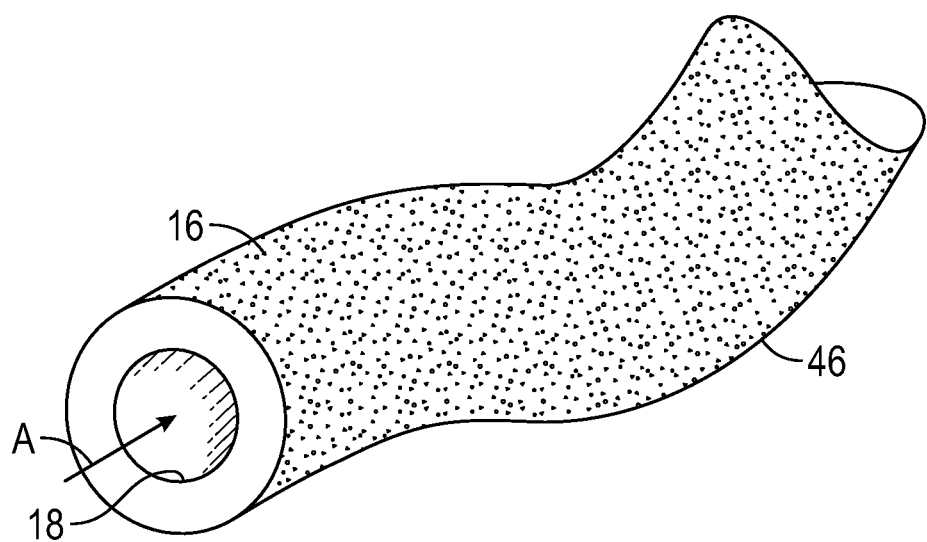
FIG. 11 is a schematic isometric view of a hollow yarn of the knitted textile of FIG. 10.

With reference to FIGS. 10 and 11, the knitted textile 10 includes a first knitted fabric layer 38, a second knitted fabric layer 40, and a knitted spacer fabric 42 directly interconnecting the first knitted fabric layer 38 and the second knitted fabric layer 40. The knitted spacer fabric 42 includes a plurality of moisture-wicking yarns 44 that directly interconnect the first knitted fabric layer 38 and the second knitted fabric layer 40 to transport moisture from the first knitted fabric layer 38 toward the second knitted fabric layer 40. Accordingly, the term "moisture-wicking yarn" means yarns that are specifically configured to move moisture by capillary action from the inside to the surface. As a non-limiting example, the moisture-wicking yarn 44 is wholly or partly made of a polyester blend. The second knitted fabric layer 40 includes a plurality of absorbent yarns 46 to collect the moisture transported from the first knitted fabric layer 38 to the second knitted fabric layer 40 through the plurality of moisture-wicking yarns 44. For this reason, the first knitted fabric layer 38 is configured to face the occupant O, whereas the second knitted fabric layer 40 is configured to face away from the occupant O. The second knitted fabric layer 40 may include anti-microbial yarns 48 to kill bacteria. The second knitted fabric layer 40 includes yarn loops 50 (or other knitted feature) capable of maximizing the speed of moisture evaporation. Each of the absorbent yarns 46 includes a yarn body 16 and a yarn hole 18 extending through the yarn body 16 to allow air (or other suitable gas) to flow through the yarn body 16. Each of the absorbent yarns 46 is wholly or partly made of a hygroscopic material to absorb moisture in response to the air A flowing through the yarn hole 18 of each of the absorbent yarns 46.

Figure 12:
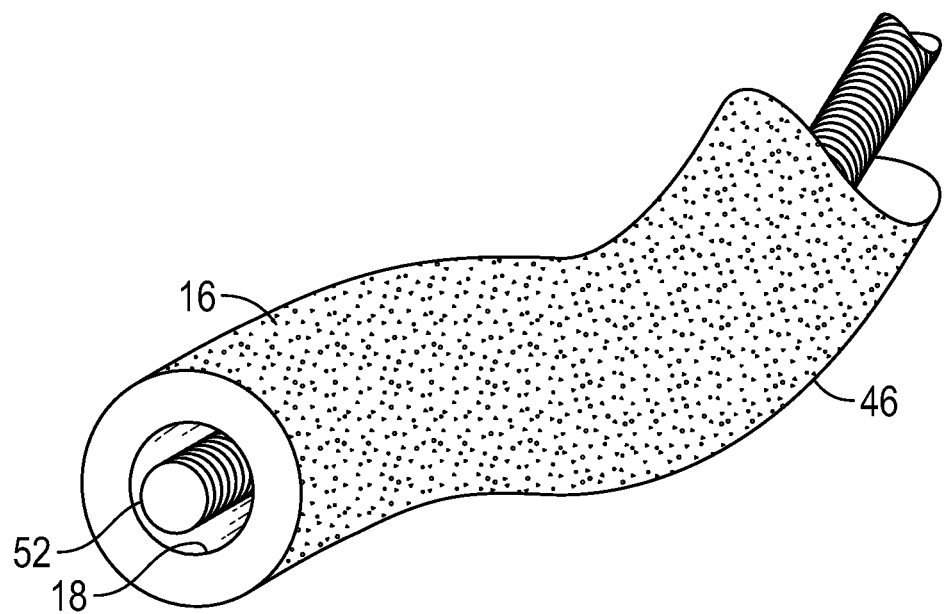
FIG. 12 is a schematic isometric view of hollow yarn of the knitted textile of FIG. 10, depicting a hydrophilic core extending through the hollow yarn.

In the embodiment depicted in FIG. 12, the yarn body 16 is wholly or partly made of a hygroscopic material configured to absorb moisture. Further, each of the absorbent yarns 46 includes a core 52 extending through the yarn hole 18. The core 52 is wholly or partly made of a hydrophilic material to aid in a capillary action of moisture. Instead of the core 52, a hydrophilic coating is applied on the interior of the yarn body 16.

While the best modes for carrying out the teachings have been described in detail, those familiar with the art to which this disclosure relates will recognize various alternative designs and embodiments for practicing the teachings within the scope of the appended claims. The knitted textiles 10 illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Alternatively, the interior hollow of the hygroscopic yarn can be coated with a hydrophilic coating to help pull moisture from the tube body and pass it down the tube length.

The invention claimed is:

1. A knitted textile, comprising:
a knitted structure including a plurality of hollow yarns, wherein each of the plurality of hollow yarns includes a yarn body, and each of the plurality of hollow yarns defines a yarn hole extending through the yarn body to allow expansion of the yarn body upon inflation of each of the plurality of hollow yarns through the yarn hole and collapse upon drawing a vacuum;
wherein the knitted structure is configured to transition from an unexpanded state to an expanded state in response to the inflation of the hollow yarns through the yarn hole;
wherein each of the plurality of hollow yarns is inflatable to allow the yarn body to expand upon inflation of each of the plurality of hollow yarns through the yarn hole;
wherein each of the plurality of hollow yarns is deflatable;
wherein each of the plurality of hollow yarns has an inflated state and a deflated state;
wherein each of the plurality of hollow yarns has a first shape in the deflated state;
wherein each of the plurality of hollow yarns has a second shape in the inflated state, the second shape being different from the first shape;
wherein the knitted structure has a first porosity in the unexpanded state;
wherein the knitted structure has a second porosity in the expanded state;

wherein the knitted structure is in the unexpanded state when each of the plurality of hollow yarns is in the deflated state;

wherein the knitted structure is in the expanded state when each of the plurality of hollow yarns is in the inflated state; and wherein the second porosity is less than the first porosity such that a visibility through the knitted structure is greater when the knitted structure is in the unexpanded state than when the knitted structure is in the expanded state.

2. The knitted textile of claim 1, wherein the hollow yarns are tubular yarns.

3. The knitted textile of claim 1, wherein a breathability through the knitted structure is greater when the knitted structure is in the unexpanded state than when the knitted structure is in the expanded state.

4. The knitted textile of claim 1, wherein each of the plurality of hollow yarns includes an elastomer.

5. The knitted textile of claim 1, wherein the knitted structure defines a plurality of pores between the plurality of hollow yarns, and the plurality of pores have a first average pore size when the knitted structure is in the unexpanded state, the plurality of pores have a second average pore size when the knitted structure is in the expanded state, and the second average pore size is less than the first average pore size such that a thermal conductivity of the knitted structure is less when the knitted structure is in the expanded state than when the knitted structure is in the unexpanded state.

6. The knitted textile of claim 5, wherein each of the plurality of hollow yarns includes a plurality of dopant particles.

7. The knitted textile of claim 6, wherein each of the plurality of dopant particles are thermally conductive particles.

8. The knitted textile of claim 7, wherein the dopant particles are closer to each other when the knitted structure is in the unexpanded or collapsed state than when the knitted structure is in the expanded state such that an thermal conductivity of the knitted structure is greater when the knitted structure is in the unexpanded state than when the knitted structure is in the expanded state.

* * * * *